United States Patent [19]

Lerner

[11] 3,974,695

[45] Aug. 17, 1976

[54] DOUBLE LEVEL GAUGE

[75] Inventor: Julius Lerner, Broomall, Pa.

[73] Assignee: Sun Oil Company of Pennsylvania, Philadelphia, Pa.

[22] Filed: Aug. 18, 1975

[21] Appl. No.: 605,779

[52] U.S. Cl. .............................. 73/304 C; 73/306; 73/313
[51] Int. Cl.² .................... G01F 23/10; G01F 23/26
[58] Field of Search .............. 73/304 R, 304 C, 306, 73/308, 313

[56] References Cited
UNITED STATES PATENTS

| | | | |
|---|---|---|---|
| 2,524,933 | 10/1950 | Silverman | 73/304 R X |
| 2,836,739 | 5/1958 | Mesh | 73/304 C X |
| 3,473,380 | 10/1969 | Mayer et al. | 73/304 C |
| 3,644,821 | 2/1972 | Long | 73/304 C X |
| 3,935,741 | 2/1976 | Zinsmeyer et al. | 73/313 |

Primary Examiner—Herbert Goldstein
Assistant Examiner—Frederick Shoon
Attorney, Agent, or Firm—J. Edward Hess; Donald R. Johnson; Gary V. Pack

[57] ABSTRACT

In an environment having two or more immiscible liquids wherein a first liquid floats on top of the second liquid, a gauging system which senses the depth of the first liquid which is floating on top of the second liquid. A float holding a capacitance probe which passes through the entire depth of the first liquid maintains the probe at the free surface level at all times. A cable wrapped around a drum and connected to the float is used for determining the free surface liquid level.

6 Claims, 2 Drawing Figures

U.S. Patent   Aug. 17, 1976   3,974,695
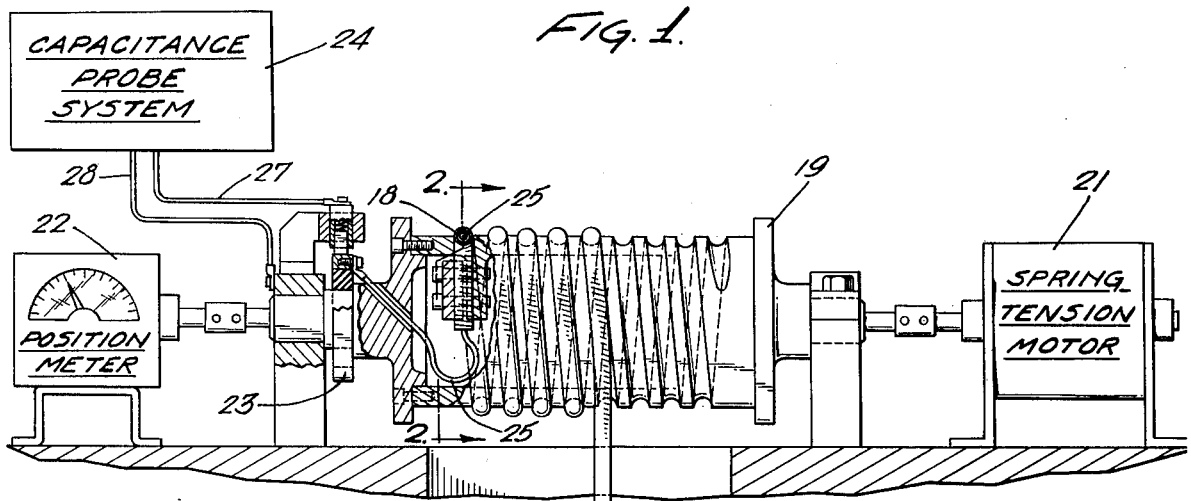
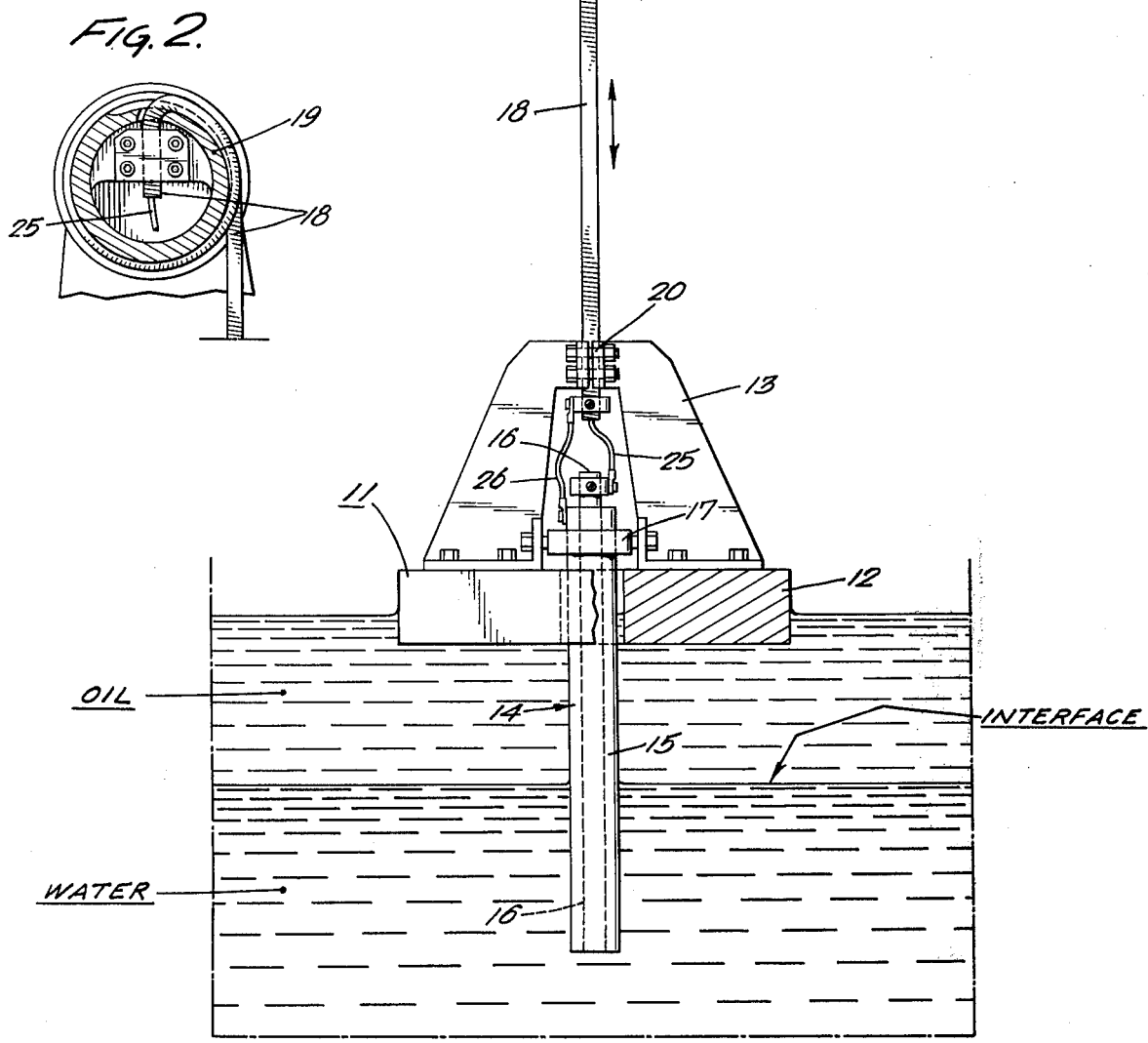

DOUBLE LEVEL GAUGE

BACKGROUND OF THE INVENTION

This invention relates to systems for determining the liquid level in a container and more specifically to a system which is designed to determine the depth of a first liquid which floats on a second liquid as the free surface level varies.

There are many devices currently available which can be used to detect the liquid level of a liquid in a container. However, these devices are not applicable to an environment where two immiscible liquids are in the same container and the free surface liquid level is constantly varying. This environment is found in refinery locations where hydrocarbons are stored or in settling ponds where oil and water are separated before the water is discharged into a nearby waterway. To determine the depth of the first fluid which floats on the second fluid, a system which uses the free surface level as a reference when determining the depth of the first liquid is required.

SUMMARY OF THE INVENTION

In accordance with a preferred embodiment, a double level gauging system is provided which monitors the free surface level of a first liquid and maintains a reference at the free level for determining the depth of the first liquid. This embodiment comprises a platform which floats on top of the free surface level of the liquids, and holds a capacity probe which extends below the maximum anticipated depth of the first floating liquid. A cable is connected to the top of the floating platform and wound around a rotatable drum which is designed to maintain a constant tension on the cable. The lead wires for the capacitance probe pass inside the cable from the probe to the capacitance circuit through a slip ring arrangement on the end of the drum.

According to this embodiment, the floating platform maintains the capacitance probe at the free surface level for a constant reference point. The capacitance probe can thereby be calibrated from 0% to 100% of the probe length being immersed in the first fluid. A means for providing a constant tension on the cable is used so that the position of the drum is known in order to determine the level of the floating platform, thereby giving the free surface level.

This system is particularly useful in a settling tank used in a refinery to separate the oil from the water before the water is released into a nearby waterway. The free surface level can be monitored to prevent overflow of oil into the waterway and the depth of the oil floating on top of the water can be monitored so that when it reaches a given amount, the oil can be removed before it is released with the water. This system is also applicable to use in a large hydrocarbon storage vessel to monitor not only the amount of oil being stored, but also the amount of water which has accumulated in the tank.

A better understanding of this invention and its advantages can be seen in the following descriptions of the Figure and the preferred embodiment.

DESCRIPTION OF THE DRAWING AND PREFERRED EMBODIMENT

FIG. 1 illustrates a schematic drawing of the preferred embodiment of a double level gauge according to this invention.

FIG. 2 illustrates a detailed view of the cable connection to the drum in FIG. 1.

Referring to the Figures, a floating platform 11 is provided which floats on the surface of the liquids. A possible design of floating platform 11 includes a floating portion 12, having a density such that the floating platform will be able to float on hydrocarbons, and having a structural frame 13 secured to the top of floating material 12. A capacitance probe 14 is secured at its upper end to the inside of frame 13. Capacitance probe 14 may be of any design, however, for example only, a coaxial probe is illustrated in FIG. 1. Capacitance probe 14 has an outer cylindrical shroud 15, which acts as the ground for the probe, and an inner probe 16. Insulators (not shown) spaced inside shroud 15 maintain probe 16 in coaxial alignment with shroud 15. A clamping arrangement 17, located on the platform framework 13, is provided to secure shroud 15 of capacitance probe 14 to frame 13 of floating platform 11.

A hollow cable 18, which is wound around drum 19, extends downward to frame 13 of floating platform 11 and secured thereto by clamping means 20. The axle of drum 19 is secured to a spring tension motor 21 which maintains a constant tension on drum 19 to take up the slack in cable 18. A position meter 22 is also connected to drum 19, to provide a reading as to the length of cable 18 unwound from drum 19 so that the free surface liquid level upon which floating platform 11 floats is indicated. Capacitance probe system 24 displays the capacitance values obtained by probe 14 and is connected to the probe through slip ring arrangement 23 and lead 27. Lead 25 travels through cable 18 and connects inner probe 16 to slip ring arrangement 23. Lead 26 connects outer shroud 15 to cable 18 to form an electrical ground. Lead 28 acts as the ground for capacitance probe system 24 and is connected to the frame of drum 19.

For operation, capacitance probe 14 is calibrated to obtain the low end and the high end of its capacitance scale. These points are obtained by having the probe fully immersed in water and fully immersed in oil. The capacitance value will vary in a linear relationship between the low and the high end so that through proper calibration, the depth of the oil resting on top of the water can be determined.

As the free surface liquid level rises, floating platform 11 also rises. The slack created in cable 18 is wound around 19 by spring tension motor 21. When the free surface level falls, floating platform 11 also falls and the cable is unwound from drum 19 at the same time. Position meter 22 is designed to monitor the rotation of drum 19 so as to give an exact indication of where the floating platform is, thereby indicating the free surface liquid level.

When using such a system in a hydrocarbon storage facility, the position meter can be connected in with a pumping control system to shut off automatically the flow of hydrocarbons into the tank when the tank becomes full. The exact amount of hydrocarbons floating on top of the water in the tank can then be determined by the capacitance probe 14. By knowing these two values, the amount of water at the bottom of the tank can be determined so that when it reaches a given amount it can be drained out.

In a settling tank the position meter can be connected to a control system to prevent overflowing of the settling tank and the subsequent flow of oil into waterways. The reading from capacitance probe 14 will indicate the amount of oil floating on top of the water and thereby indicate when enough water has been collected to be able to release this water without releasing any oil at the same time, or when some of the oil should be removed.

While a particular embodiment of this invention has been shown and described, it is obvious that changes and modifications can be made without departing from the true spirit and scope of the invention. It is the intention of the appended claims to cover all such changes and modifications.

The invention claimed is:

1. In a container holding two immiscible fluids, a first fluid having a density less than a second fluid so that the first fluid floats on top of the second fluid, a system for determining the free surface level of the liquids and the depth of the first fluid, and comprising:
   a. means for determining the depth of the first liquid having,
      i. a capacitance probe having a length sufficient to pass vertically through the first liquid,
      ii. movable means, located at the free surface level, for maintaining the capacitance probe in a vertical position so that the capacitance probe passes entirely through the first liquid, and
      iii. means for receiving and indicating the capacitance value of the capacitance probe, said capacitance value being related to the depth of the first fluid; and
   b. means for determining the free surface level of the two liquids by determining the level of the maintaining means.

2. The system recited in claim 1 wherein the maintaining means comprises:
   a. a float;
   b. a structural frame secured to the top of the float; and
   c. means for securing the upper end of the capacitance probe to the structural frame.

3. The system recited in claim 2, wherein the free surface level determining means comprises:
   a. a drum, rotatably mounted at a location above the free surface level;
   b. a cable secured to the drum and wound around it, having its free end extending down to and connected to the maintaining means;
   c. means for maintaining proper tension on the drum so that any slack in the cable is taken up by winding more cable around the drum and so that cable is unwound from the drum when the maintaining means drops with the free surface level; and
   d. means for indicating the amount of cable unwound from the drum, so that the free surface level can be determined.

4. The system recited in claim 3 wherein said means for maintaining proper tension on the drum comprises a spring tension motor.

5. The system recited in claim 1, wherein the free surface level determining means comprises:
   a. a drum, rotatably mounted at a location above the free surface level;
   b. a cable secured to the drum and wound around it, having its free end extending down to and connected to the maintaining means;
   c. means for maintaining proper tension on the drum so that any slack in the cable is taken up by winding more cable around the drum and so that cable is unwound from the drum when the maintaining means drops with the free surface level; and
   d. means for indicating the amount of cable unwound from the drum, so that the free surface level can be determined.

6. The system recited in claim 5 wherein said means for maintaining proper tension on the drum comprises a spring tension motor.

* * * * *